US009599974B2

(12) United States Patent
Maturana et al.

(10) Patent No.: US 9,599,974 B2
(45) Date of Patent: Mar. 21, 2017

(54) SYSTEM FOR DYNAMIC CONNECTION OF DISTRIBUTED ADVANCED PROCESS CONTROL COMPONENTS WITH CONTROL LEVEL APPLICATIONS

(71) Applicant: Rockwell Automation Technologies, Inc., Mayfield Heights, OH (US)

(72) Inventors: Francisco P. Maturana, Lyndhurt, OH (US); Pavel Tichy, Nove Mesto nad Metuji (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 640 days.

(21) Appl. No.: 14/090,362

(22) Filed: Nov. 26, 2013

(65) Prior Publication Data
US 2015/0148914 A1 May 28, 2015

(51) Int. Cl.
| G05B 15/02 | (2006.01) |
| H04L 29/08 | (2006.01) |
| G05B 19/418 | (2006.01) |
| G05B 19/05 | (2006.01) |

(52) U.S. Cl.
CPC ........... *G05B 15/02* (2013.01); *G05B 19/054* (2013.01); *G05B 19/4186* (2013.01); *H04L 67/2823* (2013.01); *G05B 2219/1126* (2013.01); *G05B 2219/31116* (2013.01); *Y02P 90/185* (2015.11)

(58) Field of Classification Search
CPC ... H04L 67/12; H04L 67/2823; G05B 19/418; G05B 2219/31166; G05B 19/409; G05B 19/0426; G05B 19/4186
See application file for complete search history.

(56) References Cited

U.S. PATENT DOCUMENTS

| 5,845,149 A | 12/1998 | Husted et al. |
| 8,086,670 B1* | 12/2011 | Zink .................... G05B 19/054 700/21 |
| 9,392,072 B2* | 7/2016 | Bezdicek ............ H04L 67/2823 |
| 2006/0259160 A1* | 11/2006 | Hood ................. G05B 19/4188 700/20 |

(Continued)

FOREIGN PATENT DOCUMENTS

| CN | 1940785 A | 4/2007 |
| EP | 1770459 A2 | 4/2007 |

(Continued)

OTHER PUBLICATIONS

EP Extended Search Report; EP Patent Application No. 14 193 966.0; Dated Sep. 11, 2015.

(Continued)

*Primary Examiner* — Ramy M Osman
(74) *Attorney, Agent, or Firm* — Boyle Fredrickson, S.C.

(57) ABSTRACT

Systems, methods, and apparatuses are provided for a "path affinity" engine that may work in the background to discover route information needed to connect industrial control components to control level data using "tag names." Connections may be established dynamically through the path affinity engine, thereby simplifying the commissioning process and allowing connections to be made on an as needed basis. Accordingly, discovery of tag locations at runtime may be permitted, and implementing hardware changes in industrial control environments may be greatly simplified.

19 Claims, 6 Drawing Sheets

(56) References Cited

U.S. PATENT DOCUMENTS

| | | | | |
|---|---|---|---|---|
| 2007/0078956 A1* | 4/2007 | VanGompel | ............ | H04L 67/12 709/220 |
| 2010/0050097 A1* | 2/2010 | McGreevy | ........... | G05B 19/409 715/762 |
| 2011/0191500 A1* | 8/2011 | Odayappan | ........ | G05B 19/0426 710/8 |
| 2013/0265315 A1* | 10/2013 | McGreevy | ........... | G05B 19/409 345/440 |
| 2015/0148914 A1* | 5/2015 | Maturana | ........... | G05B 19/4186 700/9 |

FOREIGN PATENT DOCUMENTS

| | | | |
|---|---|---|---|
| JP | 3010907 B2 | 2/2000 |
| JP | 5341822 A | 11/2013 |

OTHER PUBLICATIONS

The Common Industrial Protocol (CIP) and the family of CIP Networks Publication No. PUB00123RO.

* cited by examiner

SYSTEM FOR DYNAMIC CONNECTION OF DISTRIBUTED ADVANCED PROCESS CONTROL COMPONENTS WITH CONTROL LEVEL APPLICATIONS

BACKGROUND OF THE INVENTION

The present invention relates to an industrial control systems using connected messaging for highly reliable time critical control, and, in particular, to methods, systems and apparatuses allowing dynamic formation of connections between advanced process control ("APC") components and existing industrial controllers when advanced process control components are added or need to accommodate hardware changes.

Industrial controllers are special purpose computers used for controlling factory automation and the like. Under the direction of stored programs, a processor of the industrial controller examines a series of inputs reflecting the status of a controlled process and changes outputs affecting control of the controlled process. The stored control programs may be continuously executed in a series of execution cycles, executed periodically, or executed based on events.

The inputs received by the industrial controller from the controlled process and the outputs transmitted by the industrial controller to the controlled process are normally passed through one or more input/output (I/O) modules which serve as an electrical interface between the controller and the controlled process. The inputs and outputs are recorded in an I/O data table in processor memory as control level data. Input values may be asynchronously read from the controlled process by specialized circuitry. Output values are written directly to the I/O data table by the processor, and then communicated to the controlled process by the specialized communications circuitry.

In contrast to more conventional computer systems, industrial control systems generally provide for a more rugged construction resistant to environmental contamination. In addition industrial control systems normally provide a modular architecture providing greater flexibility and hardware configuration (to match a variety of different control applications), often including distributed processing of multiple programs. In this regard, an industrial control system may be assembled among multiple programmable controllers connected to an arbitrary number of I/O modules (generally hardened and fault tolerant hardware) augmented with advanced process control components which may be distributed within programmable controllers or within supervisory computer systems having a higher level of computational power but not necessarily hardened or fault tolerant.

The various components of the industrial control system may be connected together by means of a high-speed "control network" using a variety of special protocols that ensure predictable, timely and reliable communication of control data. Typically, control network protocols will employ "connected messaging" in which the bandwidth of the network and buffer space is pre-allocated to dedicated "connections" to specific hardware elements to prevent lost, unpredictably delayed data transfer, or misdirected data transfer that can occur in standard network protocols such as Ethernet alone. Examples of connected messaging include Common Industrial Protocol ("CIP") connected messaging, including as described in "The Common Industrial Protocol (CIP™) and the Family of CIP Networks," Publication Number PUB00123R0, Copyright 2006, which is hereby incorporated by reference in its entirety.

The demands of connected messaging can create significant bathers to rapid commissioning of an industrial control system because specific route information is necessary to establish a connection (typically including an identification of the hosting hardware associated with the software component) and this route information is not fully available until the last stages of commission. Accordingly, partial operation or testing of the industrial control system is delayed. Connected messaging therefore presents particular problems with advanced process control which normally requires access to control level data in multiple different controllers and when hardware changes are made in the underlying control network requiring multiple changes in underlying connection data.

SUMMARY OF THE INVENTION

The present invention provides for a "path affinity" engine that may work in the background to discover route information needed to connect industrial control components to control level data using "tag names." Connections may be established dynamically through the path affinity engine, thereby simplifying the commissioning process and allowing connections to be made on an as needed basis. Accordingly, discovery of tag locations at runtime may be permitted, and implementing hardware changes in industrial control environments may be greatly simplified.

An advanced process control component development tool may be used to program high-level behaviors for supporting the control level applications. The advanced process control component may be made of multiple procedures and interdependent algorithms. Each procedure and algorithm may include access to specific pieces of control level data found in a controller. The data can be distributed among multiple controllers. The data may be referenced by name in the controller as a tag name.

The path affinity engine may match the tag location with the routing. In an embodiment, APC components may be downloaded and executed in a computing host with connectivity to the network of controllers implementing CIP. Each advanced process control component could possess a path affinity engine that collects the advanced process control component tag name connection requests. The path that connects the advanced process control component with the controller that contains the tag may be determined dynamically upon activating the advanced process control components.

In an embodiment, a path affinity directory may scale-up path information as new tags register into the path affinity apparatus. For example, in an initial stage a local directory or cache may be empty. Then, a first tag may arrive, upon which the path affinity apparatus searches for a target controller/component to establish a connection. The path affinity apparatus may then attempt to associate the target controller/component connection with a locally stored or cached group that contains other, or perhaps all, of the tags connected to the target controller/component. The path affinity apparatus may then add a new path association to the connection group to preserve that the tag is packaged with other registered tags in the same group for communication with the target controller/component. Tag associations may be separated per connection group and kept in the local directory or cache. These groups may be nonvolatile directories or caches and may be reestablished upon power cycling.

In addition, in an embodiment, the path affinity apparatus may serve in a communication role with respect to the controller's operating system. Accordingly, the operation of the path affinity apparatus may occur in the background, essentially invisible to the user, and the controller/component may provide an interface to extract dynamically formed connection groups.

In accordance with an embodiment, a path affinity apparatus is provided for facilitating connected messaging between distributed control components. The apparatus may comprise an electronic computer executing a program stored in non-transient memory to: (a) communicate on a network connecting industrial control components storing control level data associated with tag names to provide a directory of tag names linked to route data of industrial control components holding the control level data associated with the tag name; (b) receive a request from a first industrial control component providing a tag name for control level data; (c) open a connection between the path affinity apparatus and a second industrial control component using route data linked to the tag name from the directory and provide the first industrial control component with a pointer to the connection; and (d) after step (c), receive the pointer from the first industrial control component to exchange control level data between the first industrial control component and the second industrial control component associated with the tag name using the connection.

At step (d) a second connection is open between the first industrial control component and the path affinity apparatus, wherein the exchange of control level data occurs using the connection and the second connection through the intermediary of the path affinity apparatus.

It is thus a feature of at least one embodiment of the invention for the path affinity apparatus to remain in the communication chain and utilize multiple connected messages.

The path affinity apparatus may further include the step of identifying other tag names for control level data accessible from the second industrial control component using the route data and at step (d) using the connection to exchange control level data associated with the other tag names between the second industrial control component and the path affinity apparatus.

It is thus a feature of at least one embodiment of the invention to effectively consolidate data in connections.

At step (b) the program may execute to identify a pre-existing connection associated with the tag name and delete the tag name from that connection.

It is thus a feature of at least one embodiment of the invention to update moved connections.

The route data may uniquely identify the second industrial controller hardware.

It is thus a feature of at least one embodiment to route data unique to hardware.

The control level data may provide data indicating a state of at least one input, or output communicating from an I/O module associated with the second industrial controller to a controlled process external to the second industrial controller.

It is thus a feature of at least one embodiment to open a connection for routing data to external I/O modules.

The connection may define a scheduled time of communication of a predetermined increment of data to prevent data communication delays caused by congestion of the network.

It is thus a feature of at least one embodiment to avoid network effects which may be detrimental in industrial control systems.

The first and second industrial control components may be in separate devices communicating on the network, and the separate devices may be separate from the path affinity apparatus.

It is thus a feature of at least one embodiment for communicating components to be physically located in separate/distributed hardware.

These particular objects and advantages may apply to only some embodiments falling within the claims and thus do not define the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Figure 1:
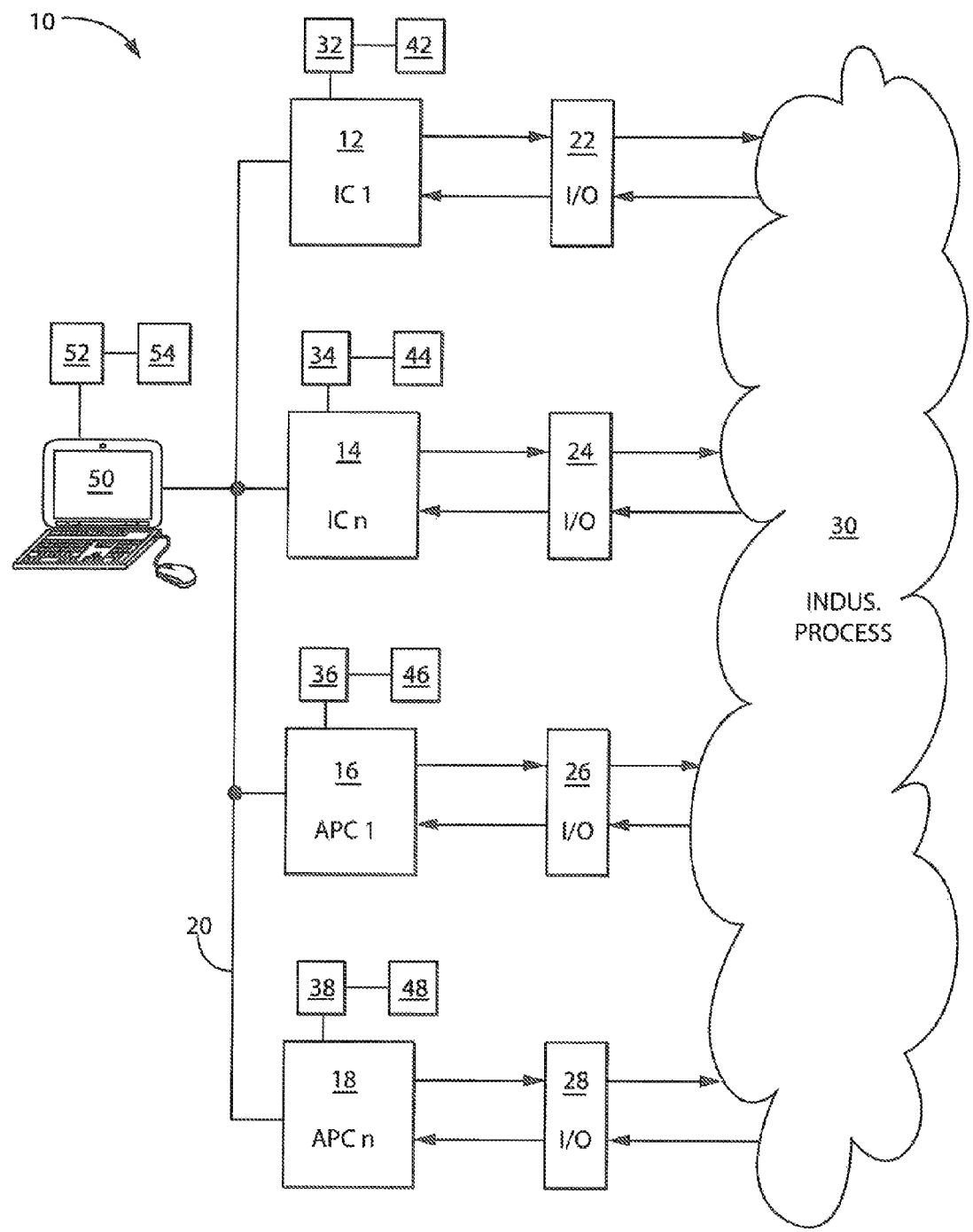
FIG. 1 is a simplified system diagram illustrating industrial control components and advanced process control components connected via a control network in accordance with an embodiment of the present invention.

Referring now to FIG. 1, an industrial control system 10 comprises a first industrial controller ("IC 1") 12, a second industrial controller ("IC n") 14, a first APC component ("APC 1") 16 and a second APC component ("APC n") 18 connected together via a control network 20. The first and second industrial controllers 12 and 14 may be programmable logic controllers used for controlling factory automation and the like. The first and second APC components 16 and 18 may also be used for controlling factory automation and the like, but in this example, may be commissioned in the industrial control system 10 at a later point in time. Alternative embodiments may vary the number and types of controllers and/or components or modules within the scope of the invention.

The control network 20 may be an EtherNet/IP, ControlNet, DeviceNet or other similar network that ensures predictable, timely and reliable communication of control data. The control network 20 employs "connected messaging," such as Common Industrial Protocol ("CIP"), in which the bandwidth of the network and buffer space is pre-allocated to dedicated "connections" to specific hardware elements to prevent lost, unpredictably delayed data transfer, or misdirected data transfer.

The first and second industrial controllers 12 and 14 and the first and second APC components 16 and 18 ("industrial control components") each connect to I/O modules 22, 24, 26, and 28, respectively (each of which could be integrated within the various control components). The I/O modules 22, 24, 26, and 28, in turn, connect to various aspects of an industrial process 30, such as inputs from sensors and outputs to actuators, and are used to accomplish varying industrial tasks.

The first and second industrial controllers 12 and 14 and the first and second APC components 16 and 18 each contain processors which execute to operate under the direction of control programs 32, 34, 36, and 38, respectively, stored in non-transient memory. The control programs 32, 34, 36, and 38 may be continuously executed in a series of execution cycles, executed periodically, or executed based on events. The control programs 32, 34, 36, and 38 reference control level data stored in tables 42, 44, 46, and 48. Accordingly, under the direction of the control programs 32, 34, 36, and 38, and with reference to tables 42, 44, 46, and 48, the first and second industrial controllers 12 and 14 and the first and second APC components 16 and 18 may examine inputs reflecting the status of the industrial process 30 and change outputs affecting control of the industrial process 30.

Also connected to the control network 20 is an electronic computer 50 providing a human machine interface ("HMI") for interacting with a user. The HMI of the computer 50 may include a monitor, keyboard, mouse, touch screen and/or other equipment as understood in the art. The computer 50 executes an affinity program 52 stored in non-transient memory and references directory data stored in table 54. In alternative embodiments, the affinity program 52 and/or table 54 may instead be executed by another device in the industrial control system 10, such as the first or second industrial controllers 12 or 14 or the first or second APC components 16 or 18.

Figure 2:
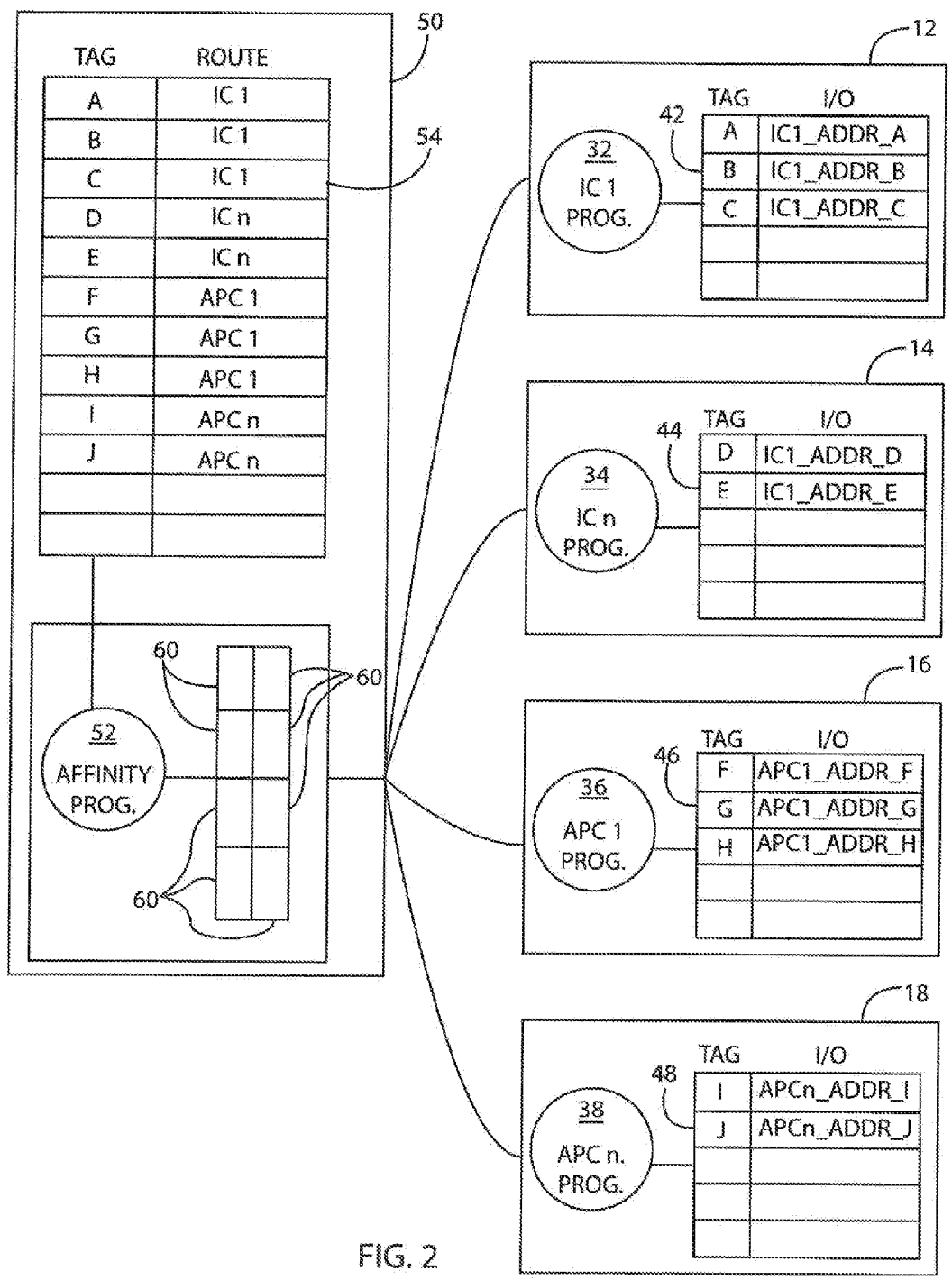
FIG. 2 is a simplified logical diagram illustrating a path affinity apparatus for facilitating connected messaging between the industrial control components and the advanced process control components of FIG. 1.

Referring now to FIG. 2, a simplified logical diagram illustrates a path affinity apparatus for facilitating connected messaging between the first and second industrial controllers 12 and 14 and the first and second APC components 16 and 18 of FIG. 1. In this embodiment, the path affinity apparatus comprises the computer 50 executing the affinity program 52. The affinity program 52 communicates on the control network 20 connecting the first and second industrial controllers 12 and 14 and the first and second APC component 16 and 18.

The first and second industrial controllers 12 and 14 and the first and second APC components 16 and 18 each store "tag names" (e.g., "A," "B," "C," and so forth) associated with control level data (e.g., "IC1_ADDR_A," "IC1_ADDR_B," "IC1_ADDR_C," and so forth), which may be I/O route data, in the tables 42, 44, 46, and 48, respectively. The tag names serve as a data exchange mechanism for the control programs 32, 34, 36, and 38 at runtime. The control level data is used for routing inputs and outputs associated with the tag names to the industrial process 30. Accordingly, by using tag names, the control programs 32, 34, 36, and 38 may be configured and executed without knowledge of the actual addressing, wiring or routing of the control level data.

The affinity program 52 communicates with the first and second industrial controllers 12 and 14 and the first and second APC components 16 and 18 to build a directory of tag names linked to route data (e.g., "IC 1," IC n," "APC 1," and so forth), which may be CIP route data, of industrial control components in the table 54. In turn, the first or second industrial controllers 12 or 14 or the first or second APC components 16 or 18 may send a request to the affinity program 52, providing a tag name for control level data it seeks.

In turn, the affinity program 52 opens a CIP connection 60 with a connection ID between the computer 50 and the affinity program 52 and the first or second industrial controllers 12 or 14 or the first or second APC components 16 or 18 storing the requested tag name with the associated control level data. The affinity program 52 uses route data from the directory in the table 54 and provides the first or second industrial controllers 12 or 14 or the first or second APC components 16 or 18 sending the request with a pointer to the connection 60. After sending the pointer, the affinity program 52 may subsequently receive the pointer from the first or second industrial controllers 12 or 14 or the first or second APC components 16 or 18 to exchange control level data associated with the tag name using the connection.

The technical effect is for a path affinity that may work in the background to discover route information needed to connect industrial control components to control level data using tap, names.

Figure 3:
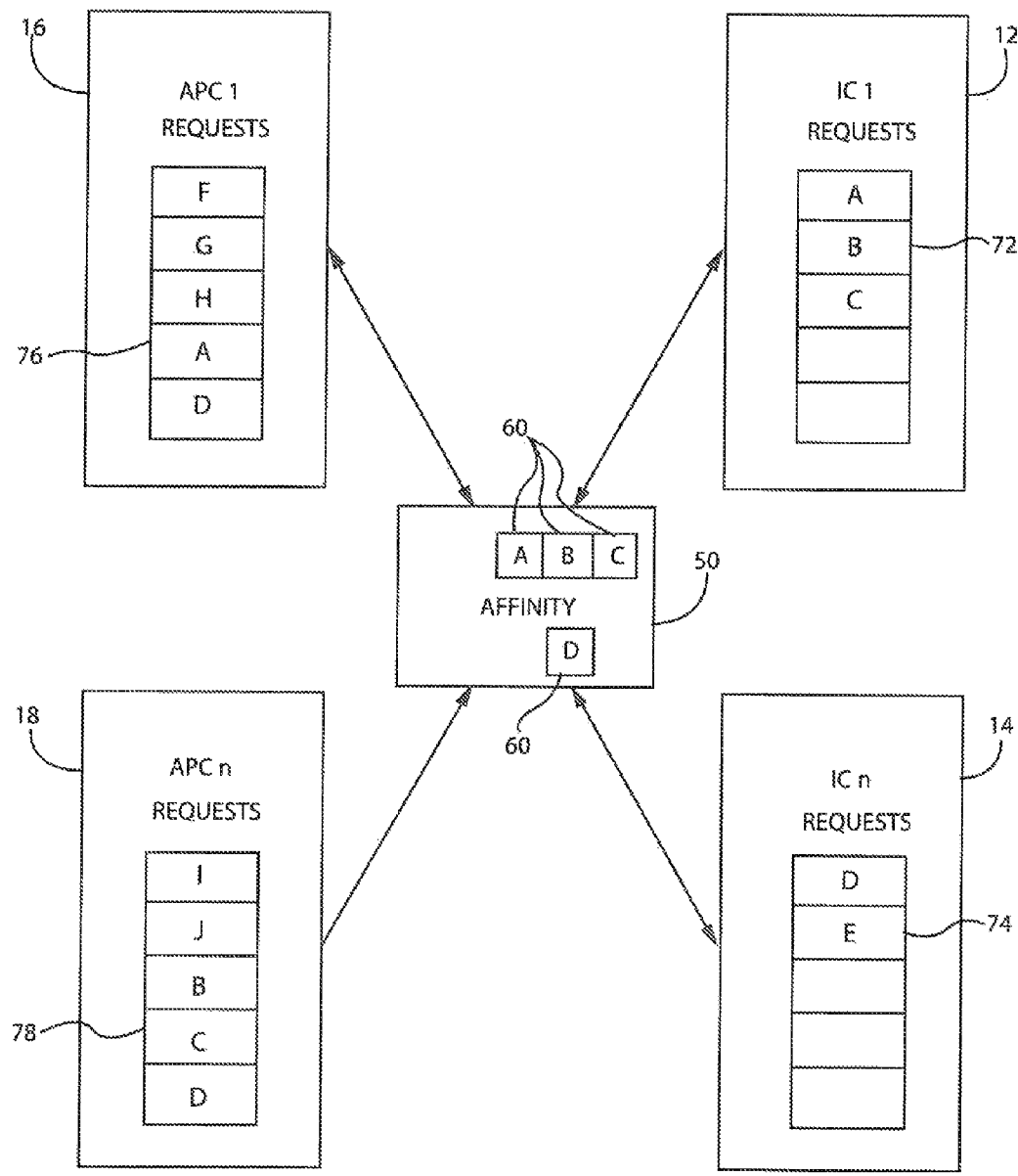
FIG. 3 is a logical diagram showing an exemplar communications between the path affinity apparatus, the industrial control components and the advanced process control components of FIG. 1.

Referring now to FIG. 3, a logical diagram provides an example of communication between the computer 50 and the affinity program 52 and the first and second industrial controllers 12 and 14 and the first and second APC components 16 and 18 of FIG. 1. In this example, the first and second industrial controllers 12 and 14 have already been commissioned in the industrial control system 10. The control program 32 running the first industrial controller 12 requests in a queue 72 tag names A, B, and C, and the control program 34 running the second industrial controller 14 requests in a queue 74 tag names D and E. As these tag names have already been associated with control level data held locally within these respective industrial controllers, these tag names may be freely used by these respective industrial control controllers to control the industrial process 30.

Next, the first and second APC components 16 or 18 are added to the industrial control system 10. The control program 36 running the first APC component 16 requests in a queue 76 tag names F, G, H, A, and D, and the control program 38 running the second APC component 18 requests in a queue 78 tag names I, J, B, C, and D.

With respect to the first APC component 16, the tag names F, G, and H may have already been associated with control level data held locally within the first APC component 16. As a result, these tag names may be freely used by the first APC component 16 to control the industrial process 30 upon commissioning. However, the tag names A and D are not locally known to the first APC component 16. Consequently, the first APC component 16 interacts with the computer 50 and the affinity program 52 with respect to tag names A and D as described above with respect to FIG. 2.

For example, the first APC component 16 may send a request with the tag names A and D to the computer 50; the computer 50 may execute to open connections 60 to the first and second industrial controllers 12 and 14 for the tag names A and D, respectively; and the computer 50 may provide pointers to the respective connections 60 to the first APC component 16. Then, the first APC component 16 may send the pointers back to the computer 50 to exchange control level data associated with the tag names A and D using the connections 60.

Similarly, with respect to the second APC component 18, the tag names I and J may have already been associated with control level data held locally within the second APC component 18. As a result, these tag names may be freely used by the second APC component 18 to control the industrial process 30 upon commissioning. However, the tag names B, C, and D are not locally known to the second APC component 18. Consequently, the second APC component 18 must interact with the computer 50 and the affinity program 52 with respect to tag names B, C, and D as described above with respect to FIG. 2.

For example, the second APC component 18 may send a request with the tag names B, C, and D to the computer 50; the computer 50 may execute to open or use currently established connections 60 to the first and second industrial controllers 12 and 14 for the tag names B, C, and D, respectively; and the computer 50 may provide pointers to the respective connections 60 to the second APC component 18. Then, the second APC component 18 may send the pointers back to the computer 50 to exchange control level data associated with the tag names B, C, and D using the connections 60. It will be appreciated that numerous other possibilities and configurations may be provided, including adding new industrial control components, distributing the computer 50 and/or the affinity program 52, and so forth, within the scope of the invention.

Figure 4:
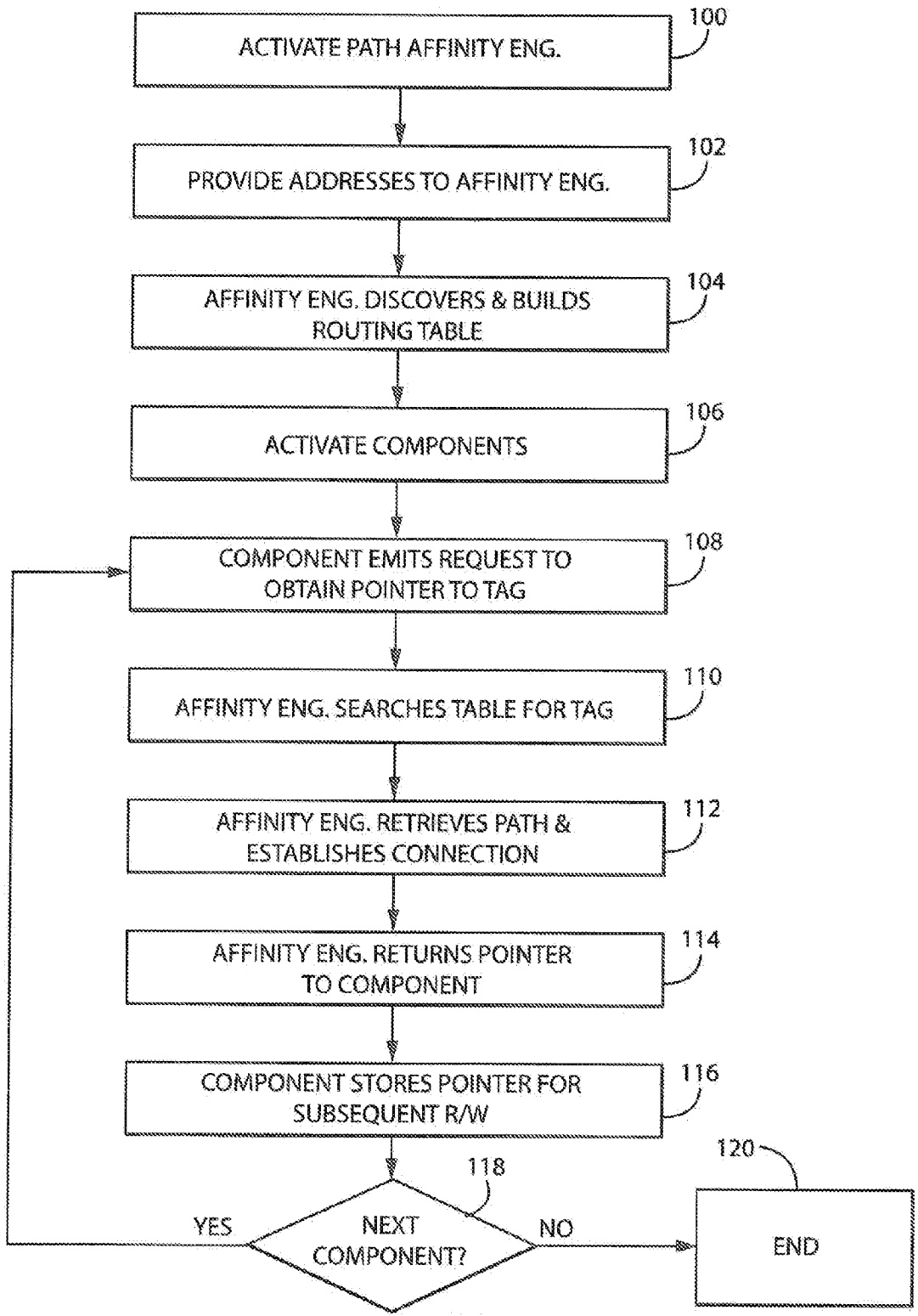
FIG. 4 is a flow diagram illustrating path affinity discovery and connection using CIP connections in accordance with an embodiment of the present invention.

Referring now to FIG. 4, a flow diagram illustrates path affinity discovery and connection using CIP in accordance with an embodiment of the present invention. In process block 100, a computer executing a program comprising a path affinity engine is activated. Next, in process block 102, CIP network entry point addresses are provided to the path affinity engine. Next, in process block 104, the path affinity engine discovers the locations of commissioned industrial controllers or APC components and builds a CIP path routing table.

Next, in process block 106, new industrial control or APC components/modules being added to the industrial control system are activated. For example, beginning in process block 108, for each new APC component/module, the APC component/module emits a request to the path affinity engine to obtain a reference pointer to a tag name. Next, in process block 110, the path affinity engine searches its routing table for a matching tag name. Next, in process block 112, following a successful matching tag name, the path affinity engine retrieves the CIP path and establishes a data table access connection with the controller. Next, in process block 114, the path affinity engine returns a reference pointer to the APC component/module, and in process block 116, the APC component/module stores the tag pointer for subsequent read/write actions.

In decision block 118, it is determined whether additional APC components/modules (or updated control programs) are present. If present, the process returns to process block 108 for the next component. Otherwise, the process ends at block 120. Accordingly, path affinity discovery and connections using CIP is provided for the new components (or updated control programs).

The path affinity engine table may scale-up path information as new tags register into the path affinity apparatus. In an initial stage the table may be empty. Then, a first tag may arrive, upon which the path affinity engine searches for an industrial controller or APC component to establish a connection. The path affinity engine may then attempt to associate the industrial controller or APC component connection with a locally stored group in the table that contains other, or perhaps all, of the tags connected to the particular industrial controller or APC component. The path affinity engine may then add a new path association to the connection group to preserve that the tag is packaged with other registered tags in the same group for communication with the particular industrial controller or APC component. Tag associations may be separated per connection group and kept in the table. These groups may be in nonvolatile memory and may be reestablished upon power cycling.

Also, the path affinity engine may serve in a communication role with respect to a controller or component's operating system. Accordingly, the operation of the path affinity engine may occur in the background, essentially invisible to a user, and the controller or component may provide an interface to extract dynamically formed connection groups.

Figure 5:
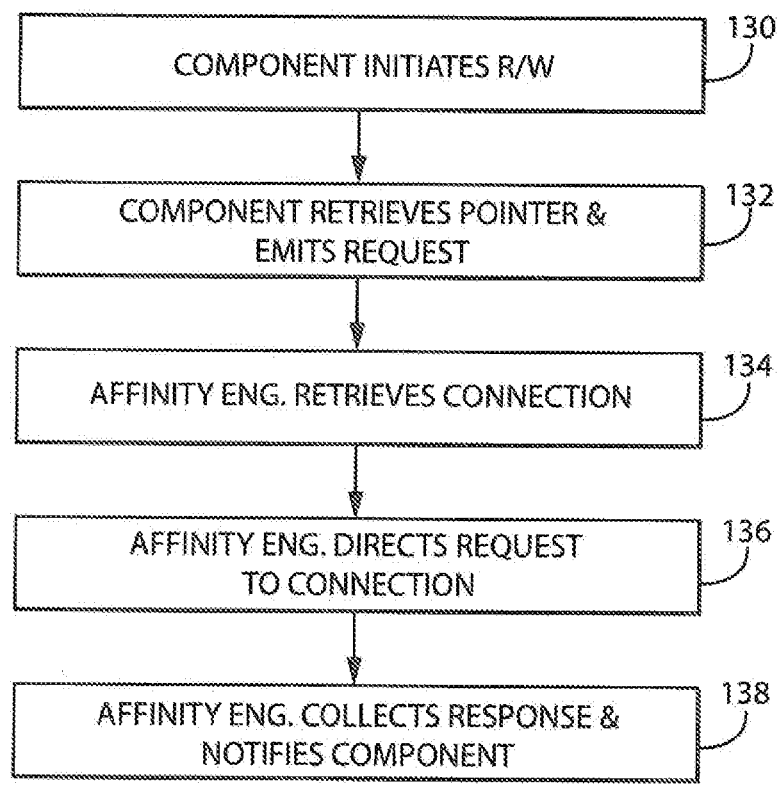
FIG. 5 is a flow diagram illustrating path affinity communication using CIP in accordance with an embodiment of the present invention.

Referring now to FIG. 5, a flow diagram illustrates path affinity communication using CIP in accordance with an embodiment of the present invention. In process block 130, an APC component/module initiates a read/write action with a controller, Next, in process block 132, the APC component/module retrieves the tag reference pointer from its stored table and emits a request to the path affinity engine. Next, in process block 134, the path affinity engine uses the tag reference pointer to retrieve the CIP connection instance. Next, in process block 136, the path affinity engine directs the request to a corresponding data table connection and waits for a response. Finally, in process block 138, the path affinity engine collects the response from the controller and notifies it back to the APC component/module.

Figure 6:
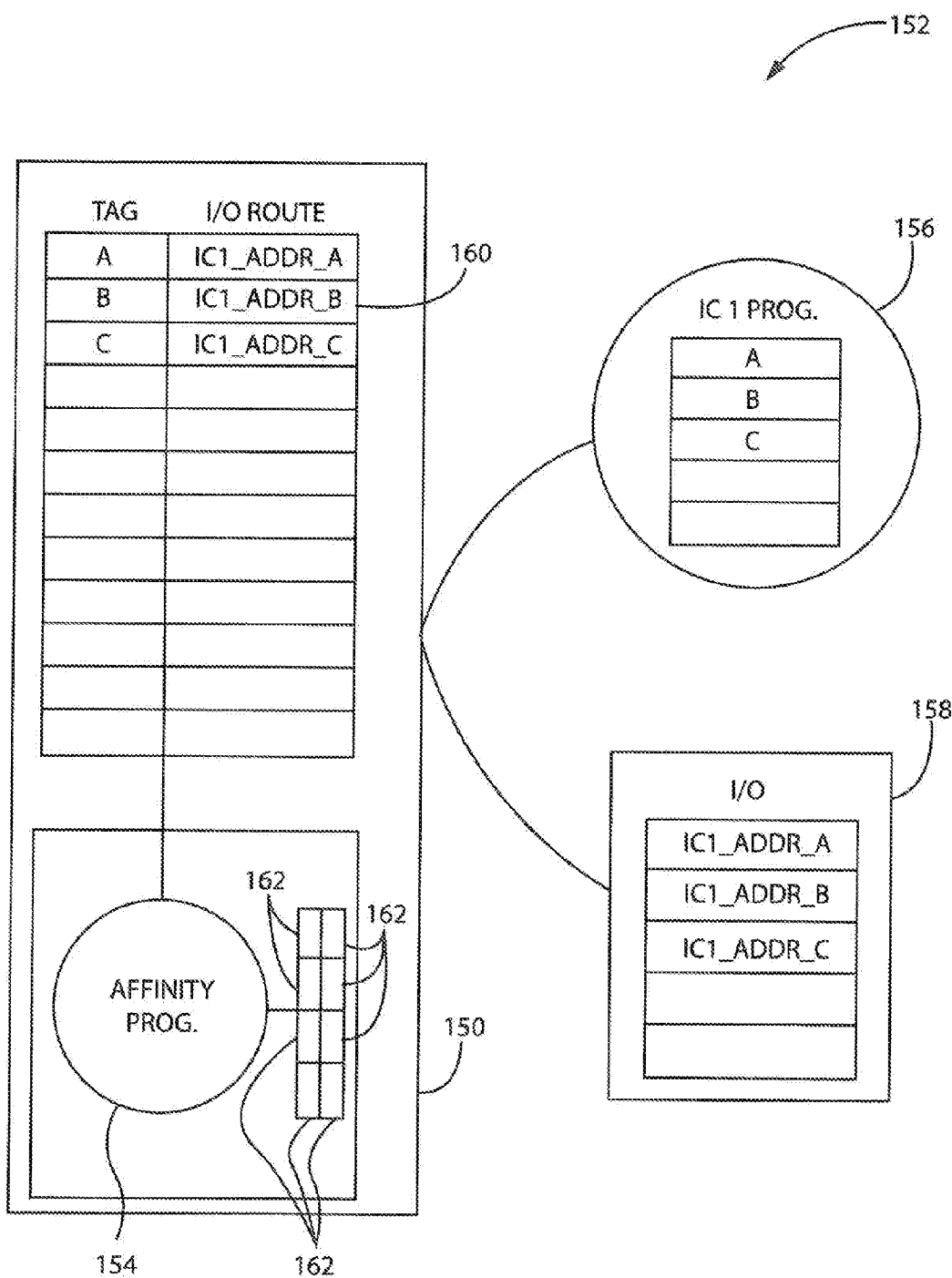
FIG. 6 is a simplified logical diagram illustrating a path affinity apparatus for facilitating discovery and connection in an industrial control or advanced processing control component/module in accordance with another embodiment of the present invention.

Referring now to FIG. 6, a simplified logical diagram illustrates another embodiment of the present invention in which a path affinity apparatus 150 facilitates discovery and connection in an industrial controller or APC component 152. In this embodiment, the path affinity apparatus 150 comprises the processor of the component 152 executing the path affinity program 154. The path affinity program 154 communicates with a control program 156 and a table 158, each of which is part of the component 152. The control program 156 provides tag names (A, B, and C) and the table 158 provides control level data ("IC1_ADDR_A," "IC1_ADDR_B" and "IC1_ADDR_C"). The control level data is used for routing inputs and outputs associated with the tag names to the industrial process 30.

The path affinity program 52 communicates with the control program 156 and the table 158 to build a directory of tag names in a table 160 linked to control level data. In turn, the control program 156 may send a request to the path affinity program 154, providing a tag name for control level data it seeks. The path affinity program 154 may then open a CIP connection 162 with a connection ID between the path affinity program 154 and the table 158 storing the associated control level data. The path affinity program 154 uses route data from the directory in the table 160 and provides the control program 156 with a pointer to the connection 162. The path affinity program 154 may subsequently receive the pointer from the control program 156 to exchange control level data associated with the tag name using the connection.

In certain embodiments, industrial controllers and APC components are provided together by way of example. However, other embodiments may be directed strictly to one or more industrial controllers, or one or more APC components, or one or more other types of industrial control devices or combinations thereof, and should not be limited accordingly.

Certain terminology is used herein for purposes of reference only, and thus is not intended to be limiting. Such terminology may include the words specifically mentioned above, derivatives thereof, and words of similar import. For example, the terms "first," "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A path affinity apparatus for facilitating connected messaging between distributed control components comprising:
   an electronic computer executing a program stored in non-transient memory to
   (a) communicate on a network connecting industrial control components storing control level data associated with tag names to provide a directory of tag names linked to route data of industrial control components holding the control level data associated with the tag name;
   (b) receive a request from a first industrial control component providing a tag name for control level data, wherein upon receiving the request, the program executes to:
      (i) identify whether pre-existing connection is associated with the tag name; and
      (ii) upon identifying a pre-existing connection associated with the tag name, delete the tag name from the pre-existing connection;
   (c) open a connection between the path affinity apparatus and a second industrial, control component using route data linked to the tag name from the directory and provide the first industrial control component with a pointer to the connection; and
   (d) receive the pointer from the first industrial control component to exchange control level data between the first industrial control component and the second industrial control component associated with the tag name using the connection.

2. The path affinity apparatus of claim 1, wherein at step (d) a second connection is open between the first industrial control component and the path affinity apparatus, wherein the exchange of control level data occurs using the connection and the second connection through the path affinity apparatus.

3. The path affinity apparatus of claim 1, further including the step of identifying other tag names for control level data accessible from the second industrial control component using the route data and at step (d) using the connection to exchange control level data associated with the other tag names between the second industrial control component and the path affinity apparatus.

4. The path affinity apparatus of claim 1, wherein the route data uniquely identifies the second industrial controller hardware.

5. The path affinity apparatus of claim 1, wherein the control level data provides data indicating a state of at least one input or output communicating from an I/O module associated with the second industrial controller to a controlled process external to the second industrial controller.

6. The path affinity apparatus of claim 1, wherein the connection defines a scheduled time of communication of a predetermined increment of data to prevent data communication delays caused by congestion of the network.

7. The path affinity apparatus of claim 1, wherein the first and second industrial control components are in separate devices communicating on the network.

8. The path affinity apparatus of claim 1, wherein the path affinity apparatus associates the connection with a group that contains other tag names stored in the second industrial control component, and wherein the group is separate from another group associated with another connection with another industrial control component.

9. The path affinity apparatus of claim 8, wherein the electronic computer is an industrial control component, and wherein the path affinity apparatus communicates with the electronic computer's operating system to extract connections and groups.

10. An advanced process control component for operating on data held in distributed control components comprising:
    an electronic computer executing a program stored in non-transient memory to:
    (a) transmit a tag name to a path affinity apparatus communicating on a network connecting industrial control components storing control level data associated with tag names, the path affinity apparatus holding a directory of tag names linked to route data of industrial control components holding the control level data associated with the to name;
    (b) receiving a pointer from the path affinity apparatus indicating establishment of a connection with an industrial control component for obtaining control level data associated with the tag name, wherein upon receiving the pointer, the program executes to;
       (i) identify whether a pre-existing connection is associated with the tag name; and
       (ii) upon identifying a pre-existing connection associated with the tag name, delete the tag name from the pre-existing connection; and
    (c) providing the pointer to the path affinity apparatus to exchange control level data with the industrial control component associated with the tag name using the connection.

11. The advanced process control component of claim 10, wherein step (a) is triggered by activating the advanced process control component.

12. The advanced process control component of claim 10, wherein step (a) is triggered by execution of a portion of the program requiring the control level data.

13. The advanced process control component of claim 10, further comprising prior to step (b) executing portions of the program not requiring the control level data associated with the tag name.

14. The advanced process control component of claim 10, wherein at step (c) a second connection between the industrial control component and the path affinity apparatus, wherein the exchange of control level data occurs using the connection and the second connection through the path affinity apparatus.

15. The advanced process control component of claim 10, further including the step of identifying other tag names for control level data accessible from the industrial control component using the route data linked to the tag name and at step (c) using the connection to exchange control level data associated with the other tag names.

16. The advanced process control component of claim 10, wherein the route data uniquely identifies the industrial controller hardware.

17. The advanced process control component of claim 10, wherein the control level data provides data indicating a state of at least one input or output communicating from an I/O module associated with the industrial controller to a controlled process external to the industrial controller.

18. The advanced process control component of claim 10, wherein the connection defines a scheduled time of communication of a predetermined increment of data to prevent data communication delays caused by congestion of the network.

19. The advanced process control component of claim 10, wherein the path affinity apparatus and the advanced process control component are in a same device communicating on the network.

* * * * *